United States Patent [19]

Richards

[11] 3,984,296

[45] Oct. 5, 1976

[54] SYSTEM AND PROCESS FOR CONTROLLING AIR POLLUTION

[76] Inventor: John R. Richards, 3926 Kelly Drive, Durham, N.C. 27707

[22] Filed: Sept. 13, 1974

[21] Appl. No.: 505,557

[52] U.S. Cl. .................... 204/157.1 R; 204/158 R; 204/162 R; 250/527; 55/10; 55/107
[51] Int. Cl.² ...................... B01J 1/10; B01K 1/00; B03C 3/01
[58] Field of Search ............. 250/527; 23/232, 254; 55/5, 7, 10, 107; 204/157.1 R, 158 R, 162 R

[56] References Cited
UNITED STATES PATENTS

| | | | |
|---|---|---|---|
| 3,560,159 | 2/1971 | Goetz | 204/162 |
| 3,562,128 | 2/1971 | Coffey | 250/527 |
| 3,565,777 | 2/1971 | Lauer | 204/157.1 R |
| 3,653,185 | 4/1972 | Scott et al. | 204/157.1 R |
| 3,785,118 | 1/1974 | Robertson | 55/10 |
| 3,869,362 | 3/1975 | Machi et al. | 204/157.1 R |
| 3,907,520 | 9/1975 | Huang et al. | 250/527 |
| 3,926,586 | 12/1975 | Matts | 55/10 |

Primary Examiner—Howard S. Williams
Attorney, Agent, or Firm—Mills and Coats

[57] ABSTRACT

The present invention relates to a system and process for controlling air pollution and basically relates to a photochemical method of removing contaminant compounds, such as sulfur dioxide and nitrogen oxides, from polluted effluent gas systems. Such contaminant compounds are first formed into complexes (such as an electron donor-acceptor molecular complexes) and clusters. After the contaminant compounds become associated with these complexes and clusters, ultraviolet light is introduced into the system resulting in the complexes or clusters being photooxidized. The photooxidization of the complexes or clusters generally tends to internally rearrange the complexes or clusters and to form non-volatile acid products that readily condense on available nuclei. The acid-like products resulting from the photooxidization treatment of the complexes or clusters can be removed from the gas system by conventonal particulate removal techniques.

12 Claims, 3 Drawing Figures

SYSTEM AND PROCESS FOR CONTROLLING AIR POLLUTION

The present invention relates to air pollution control systems and processes, and more particularly to a system and process for photochemically removing contaminant compounds from effluent gas systems.

BACKGROUND OF THE INVENTION

Systems for controlling air pollution today typically utilize chemical compounds to combine and/or react with the contaminant or contaminants of interest to form compounds or other chemical structures that may be removed from the system being controlled. While such chemical air pollution control systems are useful in controlling and reducing air pollution, it becomes apparent from a thorough study and review of such systems that they are inherently inefficient, often quite expensive in that they require large capital outlay, generate large quantities of waste material, and are awkward and difficult to adapt and install into existing effluent gas systems.

For example, one conventional means of controlling sulfur dioxide in fossil fuel fired power plants today is the system commonly referred to as a wet limestone scrubbing system. In such a system, limestone and water are introduced to the flue gases being emitted from the boiler, resulting in the formation of what is referred to as sludge. During the continuous operation of such a system, the deposit of sludge (calcium sulfate and calcium sulfite) grows and one is confronted with the problem of removing large masses of accumulated sludge. For instance, for a 100 MW coal fired power plant, it can be expected that over a twelve month period, 100,000 to 1,000,000 tons of sludge will result and require removal from the site of deposit. This, of course, presents a tremendous material handling and disposal problem and is most certainly one of the principal disadvantages to the wet limestone scrubbing technique for removing sulfur dioxide from the flue gases associated with fossil fuel fired power plants.

With the wet limestone control system, the sulfur dioxide removal efficiency falls within the 70 to 90 per cent range. However, the wet limestone control system is principally aimed at controlling the emission of sulfur dioxide, and does not effectively control the emission of nitrogen oxides. For example, in a typical wet limestone control system, one would expect less than 30 per cent of the nitrogen oxide and nitrogen dioxide to be removed from such conventional wet scrubbers of the type principally designed for controlling sulfur dioxide. Therefore, the wet limestone scrubbing system does not effectively simultaneously control the two general most harmful pollutants associated with fossil fuel fired power plant, i.e., sulfur dioxide and nitrogen oxides.

As far as the removal of nitrogen oxides from fossil fired fuel plants is concerned, there is presently no commercial effluent gas treatment control method. However, there are methods being presently developed for removing nitrogen oxides from effluent gases. Such methods being developed generally related to the use of solid catalytic materials to combine or react with the nitrogen oxides in order to convert them into a chemical form that can more readily be removed from the gas system by conventional means. The feasibility of such solid catalytic materials to remove nitrogen oxides is questionable because of the tendency of such materials to be deactivated by various coatings or poisons. In addition, the cost of catalytic materials is very high and the conversion rate achieved with such is relatively low.

SUMMARY OF THE INVENTION

The present invention relates to a system and process for efficiently controlling air pollution in which a photochemical process is utilized to efficiently rearrange previously formed complexes and clusters having a desired contaminant compound associated therewith. The photochemical stage of the air pollution system and control process involves the introduction of ultraviolet light with a spectral range of 1500 to 5000 A into the particular gas system being treated. The presence of the light tends to internally rearrange the complexes or clusters to generally form inorganic non-volatile acids. Once such non-volatile acids have been formed, it follows that they can be readily removed by the conventional particulate removal techniques.

As applied to gases being emitted from a fossil fuel fired plant, the system and process of the present invention entails the cooling of the emitted effluent gases after they leave a combustion air preheater section within the flue structure of the power plant. After the cooling of the gas to a level generally corresponding to the adiabatic saturation temperature of the gas, then both positive and negative ions are introduced into the flue structure of the gas system to form complexes which in this case are generally referred to as electron donor-acceptor molecular complexes, hereafter referred to as EDA complexes. Water vapor molecules and other chemical species inherently tend to form weakly bound clusters around the EDA complexes and the contaminant molecules not associated with EDA complexes. Once such complexes and clusters are formed, ultraviolet light is irradiated into the gas system and upon exposure to such EDA complexes, the internal structure thereof generally tends to rearrange and inorganic non-volatile acid-like products are produced, along with any number of other types of side reactions. After the inorganic non-volatile acid-like products have been formed within the effluent gas system, they tend to condense on available nuclei and can be readily removed from the system by conventional particulate techniques. The condensation of the reaction products on the particulate nuclei present in the effluent gas reduces electrical resistivity and increases particle size, both effects having favorable impact on particle collectibility in conventional particulate removal system. It should be pointed out that this system and process is not just aimed at controlling and removing sulfur dioxide, but is principally aimed and is effective in the simultaneous control and removal of sulfur dioxide, nitrogen oxides, and organic compounds.

It is, therefore, an object of the present invention to provide an air pollution control system that utilizes photochemistry to efficiently and effectively remove contaminant compounds from gas systems.

Still a further object of the present invention is to provide a photochemical system and process for controlling air pollution in which particulate collectibility is improved over former pure chemical control processes of the prior art.

A further object of the present invention is to provide an air pollution control system and process for simultaneously controlling and removing both sulfur dioxide, nitrogen oxides, and organic compounds from effluent gas systems.

Another object of the present invention is to provide a simple and relatively inexpensive air pollution control system and process that is easily adaptable to existing air systems and can be conveniently retrofitted into existing designs.

A more particular object of the present invention as the same relates to fossil fuel fired plants, is to provide an air pollution control system and process that will be compatible with high sulfur coal and which will enable such power plants to utilize high sulfur coal without significantly polluting the surrounding area.

Further in terms of air pollution control systems for fossil fuel fired plants, it is an object of the present invention to remove such gas contaminants as sulfur dioxide, nitrogen oxides and organic compounds by first forming the same into electron donor-acceptor molecular complexes, and then by a photochemical process to photooxidize such complexes to form non-volatile acid products which condense readily on available nuclei and which can be removed from the system by conventional particulate techniques.

Further in terms of air pollution control systems for chemical processing plants, it is an object of the present invention to remove such gas contaminants as reduced sulfur compounds and organic compounds by first forming the same into electron donor-acceptor molecular complexes to form non-volatile acid products which condense readily an available nuclei and which can be removed from the system by conventional particulate removal techniques.

Another object of the present invention is to provide a system and process for air pollution control which requires relatively small amounts of energy to efficiently operate.

Again, in terms of a fossil fuel fired power plant application, it is an object of the present invention to provide a system and process for controlling sulfur dioxide and nitrogen oxides wherein useful by-products naturally follow from the process, these by-products being useful and saleable in the form of sulfuric acid, nitric acid, and fertilizers.

Still a further object of the present invention is to provide an air pollution control system and process which is flexible in that the intensity and effectiveness of the total system and process can be adjusted in accordance with volumetric changes in the air of the gas system and changes in the concentration levels of the particular contaminants therein.

THE BASIC CONTROL SYSTEM AND PROCESS

Figure 1:
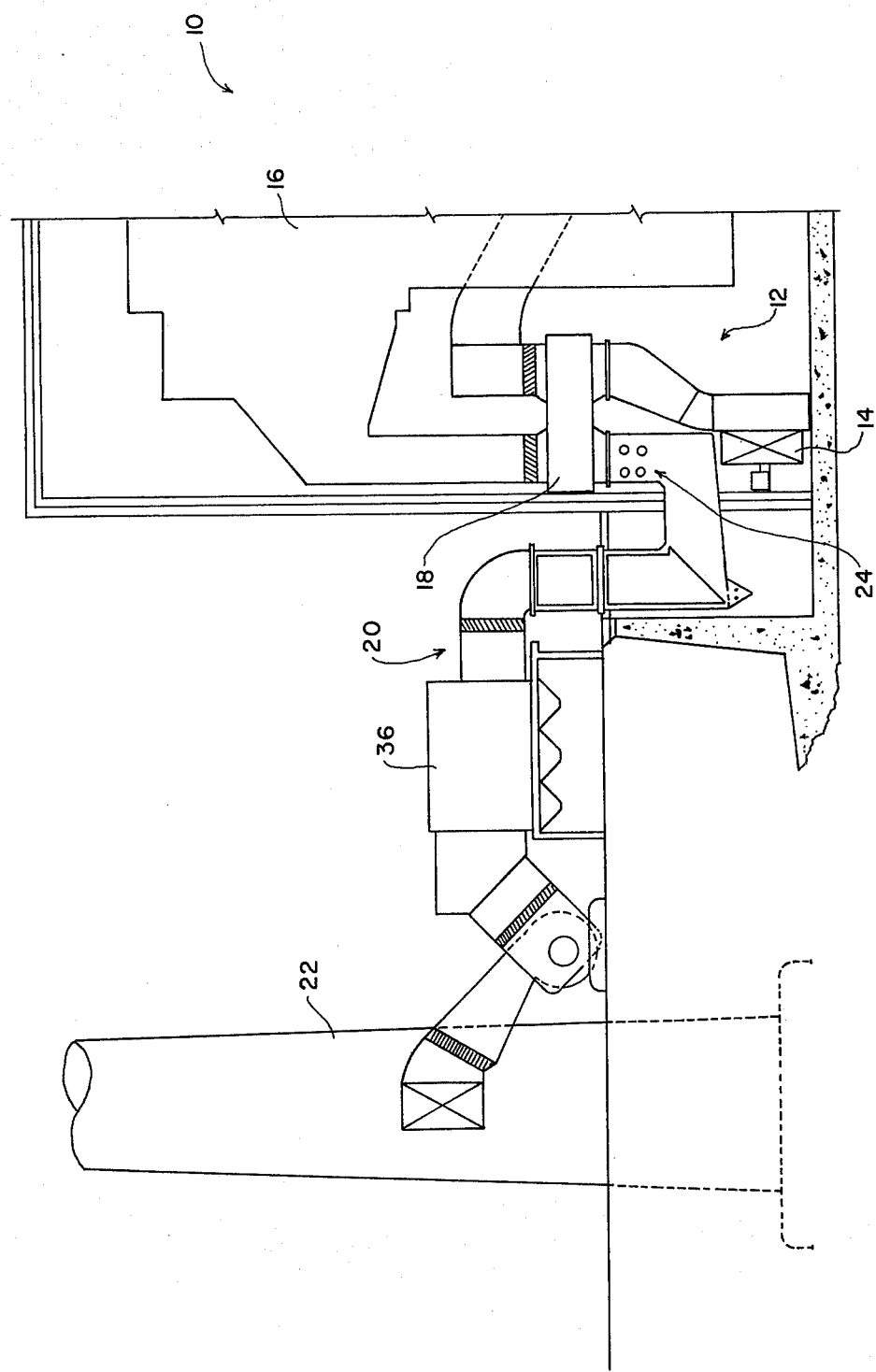
FIG. 1 is a diagrammatic side elevational view of a portion of a fossil fuel fired power plant generally illustrating the relationship of the air pollution control system and process of the present invention with the basic structure and layout of the power plant.

In describing the basic control system and process for controlling and removing contaminant compounds from a system of air, reference will be made to the control system in the context of a gas stream or system moving through a flue structure. As the gas moves through the flue structure, it is first desirable in many cases where the gas temperature exceeds 250°F. to cool the gas to a temperature within the range of 32°F. to 200°F. For optimum results, the temperatures of the gas should be reduced to a temperature level generally corresponding to the adiabatic saturation temperature of the gas, normally in the range of 120°F. to 130°F.

This cooling step of the process can be accomplished in any number of suitable ways. One convenient method is to spray or inject water into the flowing gas system at a predetermined point in the flue structure. This not only cools the gas but also it follows that the same acts as a humidifier.

After the gas system has been cooled, the contaminant or contaminants are caused to become associated with complexes and clusters within the gas system. The contaminant compound of interest may be sulfur dioxide, nitrogen oxides, nitrogen dioxide, reduced sulfur compounds such as sulfides and merceptans, hydrocarbons, odorous organic compounds, particulate matter comprised of various chemical elements resulting from various side reactions, or other such chemical compounds that are susceptible to being accepted and associated with chemical complexes and clusters such as the type referred to as electron donor-acceptor molecular complexes, referred to as EDA complexes.

Typically, such complexes or clusters are purely chemically formed. For example, where the contaminant gas is a Lewis Acid such as in the case of sulfur dioxide, Ozone, etc., a Lewis base can be added to form such a complex or cluster, such Lewis bases including negative ions, ammonia, nitrogen oxides or various hydrocarbons. In cases where the contaminant gases to be removed are Lewis bases, a Lewis acid such as positive ions, Ozone, etc., is added to form the complex or cluster. In these cases, one may refer to the complex formed as an electron donor-acceptor molecular complex.

As pointed out above, such complexes or clusters are typically purely chemically formed. In this regard, the Lewis acids or Lewis bases used could be produced by an electrostatic precipitator specifically designed to maximize corona production of $O_2$ ions without charging and collection of particulate. Alternatively, the complexes or clusters could be produced by the direct injection of the proper and desired gas.

Aside from the pure chemical technique of forming complexes or clusters, it should be pointed out that in certain cases, a photochemical technique could be used to produce the desired reactants. For example, infrared radiation (4000 A to 10,000 A) could be utilized in the place of pure chemical techniques to produce singlet and triplet molecular oxygen species. It follows that upon the production of these particular species by the infrared radiation, that such would form into complexes or clusters with the desired contaminant of interest. Also, ultraviolet irradiation (1200 A – 2400 A) could be used to produce oxygen atoms and/or Ozone.

After the particular complex has been formed, or during the formation thereof, the principal photochemical step of the process is introduced into the gas system. This principal photochemical step is the induction of ultraviolet light into the system which acts to irradiate the complexes or clusters formed or being formed, and generally has the effect of photooxidizing such complexes or clusters. The spectral range of the ultraviolet light will generally fall between 1500 A and 5000 A, with the optimum and most efficient range being between 3000 A and 4000 A.

By introducing the ultraviolet light, the internal chemical structure of the complexes or clusters generally form excited state tightly bound high energy complexes and clusters which generally rearrange internally to form non-volatile acids. These non-volatile acids have a strong tendency to condense on available nuclei.

It should be observed that the internal rearrangement of the complexes or clusters may be accompanied by side free radical reactions between the complexes involved and other compounds within the gas system.

As pointed out above, the ultraviolet light should fall within the spectral range of 1500 to 5000 A. Generally, the medium pressure mercury arcs have the highest efficiency of ultraviolet light generation in the spectral range of interest and with the necessary light intensities. Although the total required energy will depend on the contaminant gas concentration, the extent of secondary thermal reactions, and the volume of air being treated, a bank of medium pressure mercury arcs surrounding the gas flow would adequately irradiate the entire gas stream. For a 100 megawatt boiler fired with high sulfur fossil fuel, the required light input ranges from $1 \times 10^{22}$ photons per sec to $5 \times 10^{24}$ photons per sec. It very well could be beneficial to provide a system or stream of clean air around the arc lamps to reduce possible particle deposition and to improve heat dissipation.

Once the complexes and clusters have been irradiated and formed generally into inorganic non-volatile acids, these formed acid products can be removed from the system by anyone of a number of conventional particulate removal techniques. Such conventional method of removing particulate would include the use of electrostatic precipitators, an absorption scrubbing tower with sulfuric acid or other suitable liquor or demister. If the particulate material is removed by either an electrostatic precipitator or demister pads, the acidic material may be either discarded or further processed for recovery of sulfuric acid and nitric acid. If further processing is to be done, this can be accomplished away from the site of removal and the final by-products can be formed by well known chemical techniques.

The basic air pollution process outlined above is applicable to a wide range of uses and a wide range of pollutants of varying concentrations. With respect to concentration, the lower level of feasibility of use may depend on (1) the extend to which the specific pollutant forms EDA molecular complexes or other complexes or clusters, and (2) the economic costs involved in off-setting unfavorable or undesirable complexes inherent in the process. The upper concentration limit may be influenced by (1) the difficulty of designing a suitable and proper irradiation system to efficiently irradiate a gas system of extraordinary size, and (3) the availability of energy to operate the lighting system.

As pointed out above, the basic air pollution control system of the present invention utilizing photochemistry to rearrange previously formed complexes and/or clusters is suitable and adaptable to a wide range of fields. The following table illustrates the applicability of this basic process to various fields of use, the table also illustrating opposite each field of use the contaminant or contaminants desired to control and remove:

| FIELD OF USE | POLLUTANTS OF PRIME CONCERN |
| --- | --- |
| FOSSIL FUEL FIRED UTILITY BOILERS | $SO_2$, NO, $NO_2$ PARTICULATE MATTER |
| KRAFT PULP MILLS | REDUCED SULFUR COMPOUNDS (SULFIDES, MERCAPTANS), $SO_2$, NO, $NO_2$, HYDROCARBONS |
| COPPER SMELTERS | $SO_2$ |
| INEDIBLE RENDERING PLANTS | ODOROUS ORGANIC COMPOUNDS |
| GLASS FIBER INSULATING PLANTS | RESIN COMPONENTS AND PARTIAL CONDENSATION PRODUCTS (p-HYDROXYBENAL ALCOHOL, o-HYDROXYBENZ ALCOHOL, AND SUBSEQUENT PREPOLYMER RESOLES) |

APPLICATION OF BASIC SYSTEM AND PROCESS TO FOSSIL FUEL POWER PLANTS

Before proceeding with a discussion of the detail steps involved in the use of the system and process of the present invention to control air pollution in fossil fuel fired power plants, it might be beneficial to briefly review the conventional structure of such a power plant. In this regard, and with reference to the general diagrammatic view of FIG. 1, it is seen that a fossil fuel fired power plant is shown therein and indicated generally by the numeral 10. The fossil fuel fired power plant 10 basically includes an air inlet duct system 12 having a fan 14 associated therewith and particularly adapted to pull outside air through a preheater 18 into a boiler portion 16 of the power plant.

Operatively connected between the boiler 16 and a stack 22 is an interconnecting flue structure, indicated generally by the numeral 20. It is seen that this flue structure is communicatively connected to both the boiler 16 and the stack 22 and is operative to convey and channel effluent gases in the boiler 16 therefrom to the stack 22 where these gases are exhausted. From FIG. 1, it is seen that the preheater 18 is also operatively interposed within the flue structure 20 and as in conventional power plants, this preheater 18 serves as a heat exchanger to transfer the heat of exiting gases to the air passing into the boiler 16.

In fossil fuel fired power plants, it is well known that generally the two most harmful types of pollutants emitted during operation are sulfur dioxide and various forms of nitrogen oxides. As will become apparent from the subsequent discussion to follow, the basic air pollution control system and process of the present invention will be shown to have particular application in fossil fuel fired power plants of the type shown in FIG. 1 and will generally be applied in the interconnecting flue structure 20 extending between the boiler 16 and the stack 22.

Turning to the system and process for controlling and removing sulfur dioxide and nitrogen oxides from the effluent gases emitted by the boiler 16, it is seen that a water injection system 24 is installed in the flue structure 20 just below the preheater 18 and downstream therefrom. As the effluent gases emitted from the boiler, pass through the area of the flue structure 20 where the water injection system 24 is stationed, the effluent gases are cooled and humidified by the water injection system injecting water into the stream of gases. During this stage of the process, it is thought to be desirable to cool the particular gas system passing the water injection system 24 to a temperature generally corresponding to the adiabatic saturation temperature of the flowing gas system, the adiabatic saturation temperature of the typical gas system being in the range of 120°–130°F.

Figure 2:
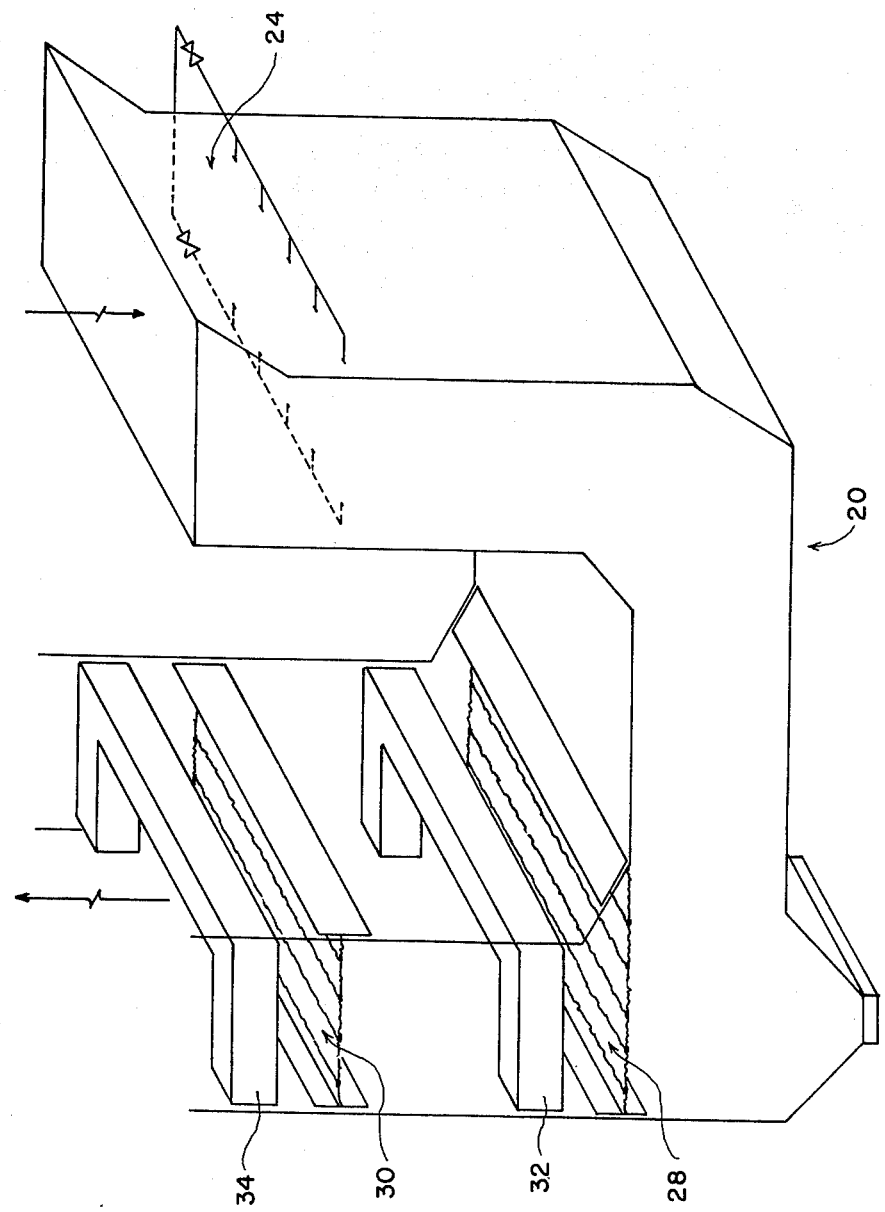
FIG. 2 is an enlarged fragmentary perspective view of a portion of the flue structure of a fossil fuel fired power plants of the type shown in FIG. 1, the fragmentary view illustrating the basic air pollution control system and the components thereof.

With particular reference to FIG. 2, it is seen that the water injection system 24 comprises a plurality of spaced apart spray nozzles, each operatively connected to a common water source line supported around the flue structure 20. However, it will be appreciated that other type cooling means could be used.

After the effluent gases have been cooled and humidified by the water injection system 24, the process then contemplates forming the contaminant compounds of sulfur dioxide and nitrogen oxides and other organic compounds (such as 3, 4 Benzpyrene, anthanthrene, and other polynuclear aromatic hydrocarbons) into complexes and clusters. Although various alternative means may be used to form such complexes and clusters as discussed hereinbefore, in this particular application of controlling sulfur dioxide, nitrogen oxides and other organic compounds, the present invention suggests the use of a pair of electrostatic precipitators 28 and 30. To combine the sulfur dioxide with complexes of the electron donor-acceptor molecular type, an electrostatic precipitator of the negative corona type is installed within the flue structure 20 as illustrated in FIG. 2. Spaced above the negative corona electrostatic precipitator 28 is a positive corona precipitator 30 adapted to form complexes of the EDA type with various forms of nitrogen oxides.

The details of such electrostatic precipitators are not dealt with herein because such details in themselves are not material to the present invention and moreover, the structure and operating characteristics of such electrostatic precipitators are well known in the art. But for the sake of discussion, it should be pointed out that the negative corona precipitator 28 would have a peak voltage of 40–100 KV and would be so designed to minimize particle deposition therearound, i.e., less than 1 ft.$^2$ of collection area per CFM of gas.

In the case of the negative corona electrostatic precipitator 28, there would be negatively charged molecular oxygen formed in sufficient quantities to combine with the sulfur dioxide in a one-to-one molar ratio. In the case of the positive corona electrostatic precipitator 30, which incidentally could operate with a peak voltage range of 10 to 20 KV, there would be produced positive ions of sufficient quantity to complex with both nitrogen oxide, nitrogen dioxide, and organic compounds.

In the particular application being discussed, the complexes formed in both the case of sulfur dioxide and nitrogen oxides are of the EDA molecular complex type.

It is appreciated that the use of electrostatic precipitators is a pure chemical method of forming the EDA molecular complexes. It should also be appreciated, as discussed hereinbefore, that such complexes or clusters could possibly be formed by the use of irradiation in the spectral range of 4000 to 10,000 A.

After the EDA molecular complexes have been formed, they are subjected to ultraviolet irradiation of a spectral range between 1500 A and 5000 A, with the optimum range considered to be between 3000 and 4000 A. The presence of the ultraviolet light initiates reactions that causes the EDA molecular complexes to generally be rearranged internally to form tightly bound, high energy complexes that generally rearrange in the form of inorganic non-volatile acids, such as sulfuric acid and nitric acid. In addition, some organic acids could be formed depending on the concentration of the combustion produced by organics within the gas system. In addition, there very well could be what may be termed free radical reactions between contaminant compounds within the gas system and other compounds and reactants found therein. All of the acid products produced as a result of the presence of the ultraviolet light and the other side reactions would be of a concentration well below the due point of the particular compound considered. Therefore, it can be expected that the resultant products in this case would condense on available nuclei, or that some of the products of this particular phase of the process would become involved in homogenous nucleation.

It might be desirable to add steam or water following the ultraviolet light irradiation treatment in order to assure that the water vapor within the gas system remains saturated and, therefore, increases the ultimate aersol sizes of the products of this particular phase of the process.

Referring to FIG. 2, it is seen that the schematic drawing therein suggest two banks of ultraviolet lights, a lower bank indicated by numeral 32 and an upper bank indicated by numeral 34. The lower bank of ultraviolet lights 32 associates with and is in close proximity to the negative corona electrostatic precipitator to form a sulfur dioxide control module within the flue structure 20. Likewise, the upper bank of ultraviolet lights 34 associates with and is in close proximity to the positive corona electrostatic precipitator 30 to form a nitric oxide control module. A detail discussion of the ultraviolet light structure is not material to the present invention since such are well known in the art, and the operative relationship of such light sources with respect to the system of gases passing through the flue structure 20 is of main concern in this case. However, a medium pressure mercury arc type ultraviolet lighting system is deemed particularly suitable for this application because of its desirable light generating efficiencies in the optimum spectral range, i.e., 3000 to 4000 A.

After the EDA molecular complexes have been irradiated with ultraviolet light and the product acids have been formed, it then simply becomes a matter of removing such product acids by conventional techniques such as by an electrostatic precipitator 36 shown in FIG. 1. In this case, the product acids are removed from the gas system passing through the flue structure by a conventional particulate technique. Again, a detailed discussion of the electrostatic precipitator of the type used in this stage of the process is not included since such is not directly material to the present invention, and further since the function and structure thereof is well known and appreciated by those skilled in the art.

The following Table basically summarizes the reactions involved in the total process with respect to sulfur dioxide and nitrogen oxides:

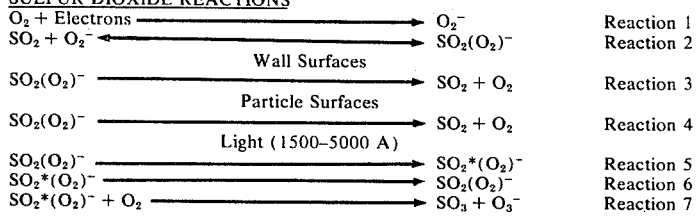

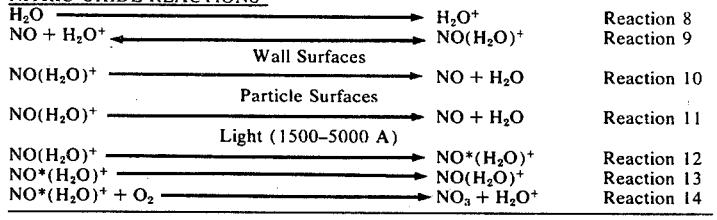

Therefore, it is appreciated that sulfur dioxide and nitrogen oxides are treated, conditioned, and removed from the effluent gas moving between the boiler 16 and stack 22 of the power plant 10. It is seen that all of the basic structure involved in the process can be conveniently placed within the flue structure 20, as particularly illustrated in FIG. 2, and that this type of system could conveniently and easily be retrofitted into existing power plant system of today. Also, it should be pointed out that the particulate matter including the chemical forms of sulfuric acid and nitric acid could be transferred from the collection site to another site for chemically converting these by-products into useful acids and other forms of useful chemicals such as fertilizer.

APPLICATION OF THE PROCESS FOR CONTROLLING AIR POLLUTION IN THE EFFLUENT GASES ASSOCIATED WITH A GLASS-FIBER INSULATION MANUFACTURING PROCESS

In the fossil fuel power plants application just described, the air pollution control system was directed to a system of gases resulting from combustion. In this application, the glass-fiber insulation manufacturing process, we are concerned with controlling pollutants that result from a pure chemical process, as opposed to combustion.

In the glass fiber insulation process, the principal pollutants of interest are organic compounds such as p-Hydroxybenzl alcohol, o-Hydroxybenzl alcohol, and subsequent prepolymer resoles. These principally result from the evaporation of incompletely reacted resin binders sprayed on newly formed, semi-molten glass fibers during the total process of manufacturing insulation. The resin monomers generally includes phenol formaldehyde, melamine and urea. The emission rate of the monomers, and resoles depend on the degree of polymerization of the binder prior to the spraying operation, the amount of excess monomer in the binder, and the type of insulation that has been produces.

Figure 3:
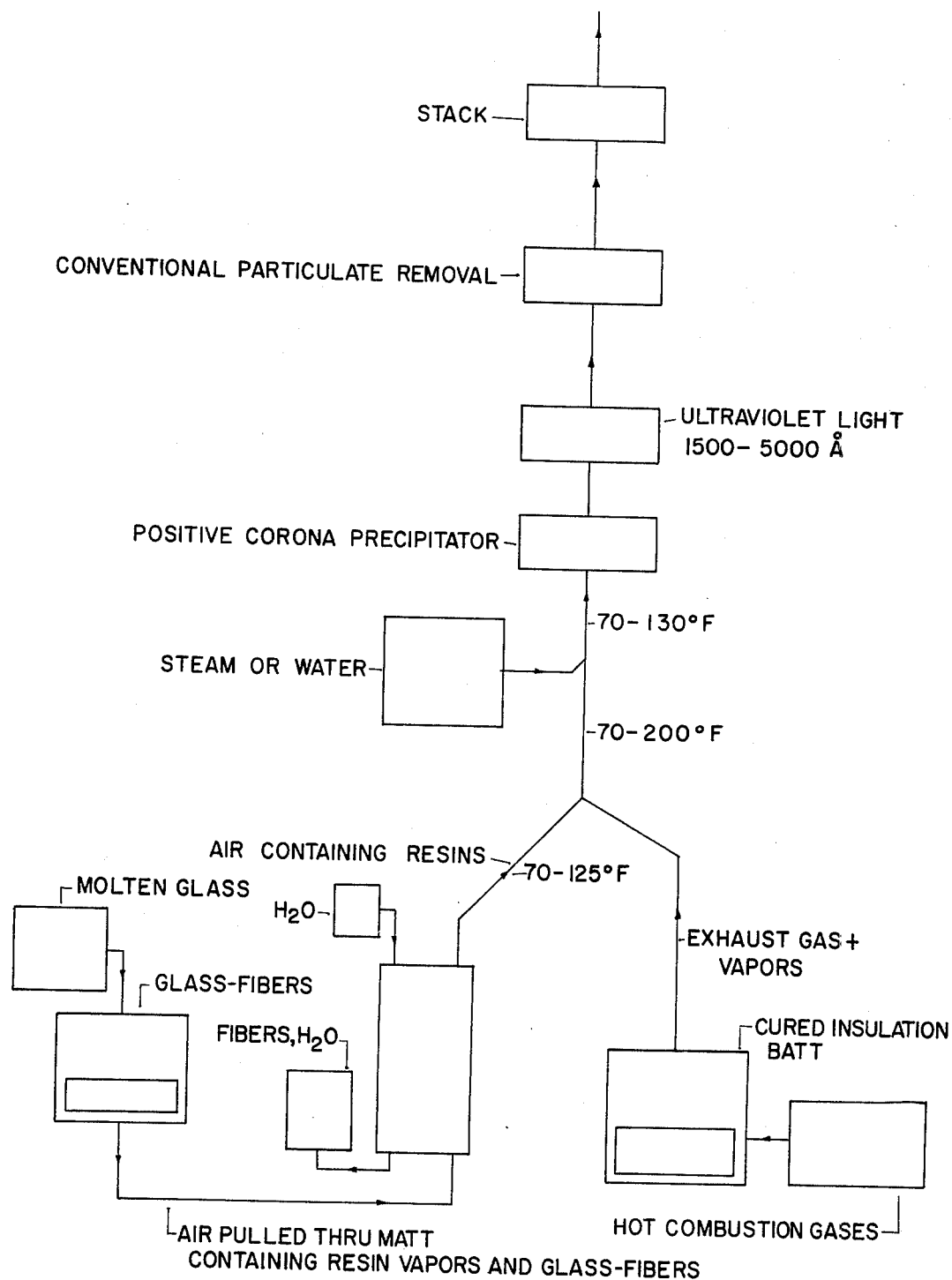
FIG. 3 is a diagrammatic flow chart illustrating the application of the present system and process for controlling pollution in a glass-fiber insulation manufacturing process.

Turning to the process as applied to insulation manufacturing and the particular diagrammatic flow chart of FIG. 3, two separate effluent systems of gas are generated within the manufacturing process. These two systems of effluent gas are: (1) the gases passing from the insulation formation chamber on the left of the diagram, and (2) the curing chamber on the right of the diagram. The gases being emitted by these two sources are mixed together and generally assume a temperature within the range of 70° to 200°F.

The control process is provided with a water and/or steam injection system adapted to produce saturation temperatures at a minimum gas temperature of approximately 120°F.

After the effluent gas has been cooled as provided for in the above step, a positive corona electrostatic precipitator of the general type previously referred to herein is used to produce complexes which tend to "tie up" (or form complexes) the organic compounds of interest, such as p-Hydroxybenzl alcohol, o-Hydroxybenzl alcohol, and subsequent prepolymer resoles.

Once these complexes have been formed, ultraviolet light of a spectral range of 1500 A to 5000 A is irradiated into the system and exposed to the formed complexes. The result of this ultraviolet irradiation follows the same general pattern as set forth above in the discussion of the basic system and process of the present invention. Particulately, the ultraviolet light acts to photooxidize the form complexes and to initiate chemical reactions which act to generally internally rearrange the complexes to form tightly bound, high energy complexes which again assume the form of non-volatile acids.

The non-volatile product acids or product aerosols are then collected from the system by a conventional particulate technique such as by the use of an electrostatic precipitator.

Therefore, from the following discussion, it is apparent that the air pollution control system and process of the present invention has a wide range of applications in various fields where pollutants and contaminant compounds are found in systems of gases. By photochemically initiating reactions which rearrange previously formed complexes, chemical compounds that are more readily collectible and removable are formed within the gas system. In addition, the system as basically disclosed herein is particularly adapted to retrofit into existing gas systems and requires a minimum of initial capital to install. Also, the process has the advantage in an application such as the fossil fuel fired power plant application to simultaneously remove more than one contaminant compound.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A photochemical process for removing gaseous pollutant compounds from a contaminant gas stream, said process comprising the steps of:
   a. positively cooling said contaminant gas stream having said gaseous pollutant compounds therein to a temperature below 200° Fahrenheit by exposing said contaminant gas stream to a cooling medium;
   b. generating electron donor or acceptor gaseous phase compounds outside of and independently of said contaminated gas stream;
   c. introducing said externally generated electron donor or acceptor gaseous phase compounds into said cooled contaminated gas stream after actual cooling to undergo acid-base type interaction with certain gaseous pollutant compounds of concern in said contaminated gas stream to yield weakly bound gaseous phases molecular complexes of definite stochiometry ratios;
   d. introducing ultraviolet light into said contaminated gas system and irradiating said formed molecular complexes for the purpose of initiating chemical reactions generally resulting in the formation of nonvolatile acid like products; and
   e. removing said resulting acid like products from said gas stream by a particulate removal technique.

2. The photochemical process for removing gaseous compounds from a gas system, as recited in claim 1, wherein the ultraviolet light introduced into said gas stream for irradiating said complexes is of a spectral range of 2000 to 4000 A.

3. The process of claim 2 wherein the step of cooling is accompanied by humidifying said contaminated gas stream.

4. The photochemical process of claim 2 wherein said electron donor or acceptor gaseous phases compounds generated and introduced into said contaminated gas stream comprises ions which form complexes with the contaminant intended to be removed from said gas system.

5. The photochemical process of claim 4 wherein the ions introduced into said gas system are both positive and negative ions, and wherein the introduction thereof into said contaminated gas system is accomplished by: exposing the contaminated gas system to both a positive and negative corona discharge within electrostatic precipitators whereby both positive and negative ions may be emitted from said precipitators into the contaminated gas system and form complexes with appropriate contaminant compounds therein.

6. A process for removing sulfur dioxide, nitrogen oxides and organic compounds from effluent gases emitted from fossil fuel fired boilers, said process comprising:
   a. cooling the effluent gases to a temperature in the general range of the adiabatic saturation temperature of the gas;
   b. introducing positive and negative ions into the effluent gas system to form electron donor-acceptor molecular complexes with the sulfur dioxide, nitrogen oxides, and organic compounds;
   c. photochemically initiating reactions resulting in the oxidation of sulfur dioxide, nitrogen oxides and organic compounds by subjecting said electron donor-acceptor molecular complexes to ultraviolet light of the spectral range of 1500 to 5000 A which generally tends to change the electron distribution within each complex and subsequently result in rearrangement and combinations of the donor and acceptor species to form nonvolatile particulate matter; and
   d. removing said resulting nonvolatile particulate compounds from said effluent gas stream by a particulate removal technique.

7. The process of claim 6 wherein the introduction of positive and negative ions is accomplished by: subjecting the effluent gas system after cooling to positive and negative corona discharges within electrostatic precipitators which emit positive and negative ions respectively.

8. A system for removing sulfur dioxide, nitrogen oxides and organic compounds from effluent gases emitted from fossil fuel fired boilers, said system comprising:
   a. means for positively cooling said effluent gas as such moves through a flue structure to a temperature below 200° Fahrenheit, said positive cooling means including a cooling medium that is actually exposed to said effluent gas;
   b. means for introducing negative and positive ions into the effluent gas system for forming electron donor-acceptor molecular complexes with the sulfur dioxide, nitrogen oxides and organic compounds passing within the effluent gas system;
   c. means for photochemically oxidizing the sulfur dioxide, nitrogen oxides and organic compounds associated with said electron donor-acceptor molecular complexes, such photochemical oxidizing means including ultraviolet light irradiating means of a spectral range of 1500 to 5000 A for irradiating light into the vicinity of the electron donor-acceptor molecular complexes to initiate donor acceptor rearrangement and combination to form nonvolatile particulate matter; and
   d. means for removing said nonvolatile particulate matter from the effluent gas system by a particulate removal technique.

9. The system of claim 8 wherein said means for introducing negative and positive ions comprises a negative corona electrostatic precipitator and a positive corona electrostatic precipitator, said precipitators being vertically spaced within said flue structure; and wherein said means for photochemically oxidizing the sulfur dioxide, nitrogen oxides and organic compounds comprises a pair of ultraviolet light sources, each light source being vertically spaced and closely associated with one of said electrostatic precipitators.

10. A system to increase the efficiency of particulate matter removal from the effluent gases emitted by fossil fuel fired boilers, and equipped with electrostatic precipitators, said system comprising:
   a. means for positively cooling said effluent gas as such moves through a flue structure to a temperature below 200° Fahrenheit, said positive cooling means including a cooling medium that is actually exposed to said effluent gas;

b. means for introducing negative ions into the effluent gas system for forming electron donor-acceptor molecular complexes with the sulfur dioxide and other Lewis acid-type gaseous compounds passing within the effluent gas system;

c. means for photochemically oxidizing the sulfur dioxide and other Lewis acid-type gaseous compounds associated with said electron donor-acceptor molecular complexes, such photochemical oxidizing means including ultraviolet light irradiating means of a spectral range of 1500 to 5000 A for irradiating light in the vicinity of the electron donor-acceptor molecular complexes to initiate donor-acceptor rearrangement and combination to form nonvolatile vaporous acidic compounds which readily condenses on particulate matter contaminants present in the effluent gas system thereby lowering the electrical resistivity and increasing the particle size, both physical modifications which improve particle collectability in electrostatic precipitators; and d. means for removing said particulate matter contaminants from said gas system.

11. A process for removing sulfur dioxide, nitrogen oxides and organic compounds from effluent gases emitted from fossil fuel fired boilers, said process comprising:

a. cooling the effluent gases to a temperature in the general range of the adiabatic saturation temperature of the gas;

b. introducing positive and negative ions into the effluent gas system to form electron donor-acceptor molecular complexes with the sulfur dioxide, nitrogen oxides and organic compounds;

c. photochemically initiating reactions resulting in the oxidation of sulfur dioxide, nitrogen oxides and organic compounds by subjecting said electron donor-acceptor molecular complexes to ultraviolet light of the spectral range of 1500 to 5000 A which generally tends to change the electron distributor within each complex and subsequently result in formation of a donor and acceptor free radical species which further react with other contaminants in the effluent gas to form nonvolatile particulate matter; and d. removing said resulting nonvolatile particulate compounds from said effluent gas stream by a particulate removal technique.

12. A process for removing low molecular weight organic compounds from the effluent gases emitted from a glass fiber insulation manufacturing process, said process for removing low molecular weight organic compounds comprising;

a. cooling the effluent gases emitted from said glass fiber insulation process to a minimum gas temperature of 120° F;

b. introducing positive ions into the cooled effluent gas system to form electron donor-acceptor molecular complexes with the low molecular weight organic compounds within said gas system;

c. photochemically initiating reactions resulting in the oxidation of said low molecular weight organic compounds by subjecting the electron donor-acceptor molecular complexes to ultraviolet light of a spectral range of 1500 to 5000 A which generally tend to change the electron distribution within each complex and subsequently result in rearrangement and combination to form nonvolatile particulate matter; and d. removing said resulting nonvolatile particulate compounds from the effluent gas system by particulate removal technique.

* * * * *